Oct. 23, 1956
L. L. LAURENCE ET AL
2,768,118
METHOD FOR OBTAINING CONDENSATE FROM HIGH
PRESSURE HYDROCARBON FLUID IN THE
FORM OF A STABILIZED PRODUCT
Filed Nov. 8, 1951
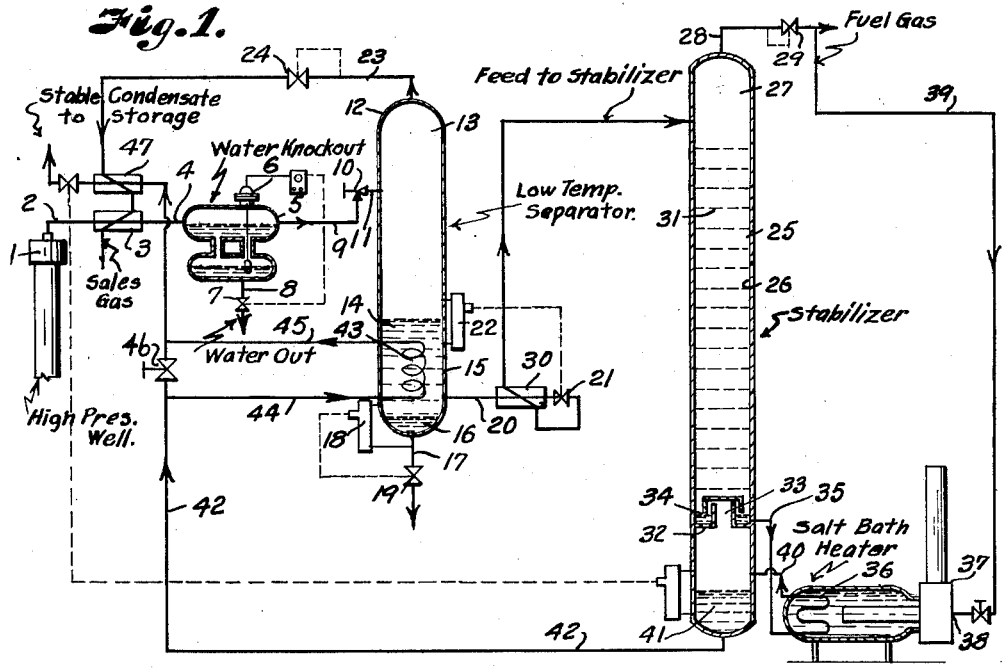
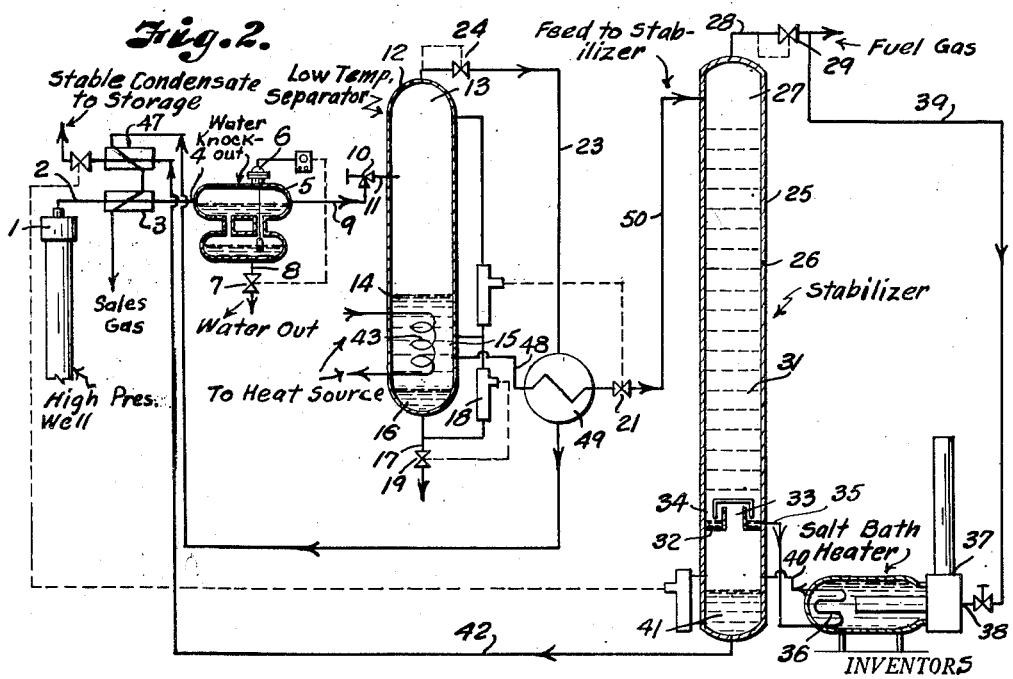
INVENTORS
Lawton L. Laurence and
BY Charles W. Hayes.
Fishburn & Mullendore
ATTORNEYS.

United States Patent Office 2,768,118
Patented Oct. 23, 1956

2,768,118

METHOD FOR OBTAINING CONDENSATE FROM HIGH PRESSURE HYDROCARBON FLUID IN THE FORM OF A STABILIZED PRODUCT

Lawton L. Laurence and Charles W. Hayes, Oklahoma City, Okla., assignors to Black, Sivalls & Bryson, Inc., Kansas City, Mo., a corporation of Delaware Application November 8, 1951, Serial No. 255,468

3 Claims. (Cl. 196—11)

This invention relates to a method and apparatus for the recovery or normally liquid constituents from the gas stream of a high pressure hydrocarbon producing well, and particularly to a method and apparatus for increasing the ultimate condensate recovery at the field of production.

Heretofore, increased condensate recovery has been accomplished by means of low temperature separation of the normally liquid constituents from a high pressure hydrocarbon gas stream, but low temperatures produce operational difficulties because of the water vapor content of the gas stream in the temperature-pressure range conducive to hydrate formation unless means are provided to remove the water vapor or to inhibit hydrate formation or to melt the hydrates after formation by heating of the condensate.

Even after the condensate has been obtained, there is a further problem of keeping the recovered condensate. When the condensate is placd in a stock tank or is mixed with the crude oil in a stock tank, the light or high vapor pressure components flash out of the liquid and carry therewith some of the valuable heavier components. In fact, this loss is greater in methods involving low temperature operation because the increased amount of condensate which is obtained carries a corresponding increased amount of light or high vapor pressure components. Consequently, there is an increased stripping of the heavier liquid components from the stored liquid. For this reason, low temperature separation methods, while condensing a large quantity of the desired product, have shown disappointing results because of the limited ultimate amount of the desirable hydrocarbon liquid that can be kept in storage.

It is obvious that stock tank losses can be greatly reduced by stabilizing the recovered condensate so that full benefit of low temperature separation can be obtained. However, stabilization of such condensates is a fractionation process carried out to separate the high vapor pressure from the low vapor pressure components through repeated counterflow contact of hydrocarbon vapors with liquid mixtures of very nearly the same composition, the liquid mixtures being at their boiling points and the vapors at their dew points. As a result, part of the vapor is condensed and part of the liquid is vaporized. Repeated contact of this character results in a vapor stream which contains most of the objectionable high vapor pressure components (propane and lighter) which are discharged from the stabilizing zone and a liquid stream containing mostly low vapor pressure components that are stable at normal storage temperatures and pressures (butane, pentane, etc.).

Heretofore, stabilization of this character has been carried out only in large installations such as gasoline plants and has not been available for use at the field of production in cooperation with a low temperature separation process capable of optimum condensate recovery and storage.

Therefore, a principal object of the present invention is to provide a low temperature separation method in cooperation with a simple stabilization method to obtain an optimum ultimate condensate recovery.

A further object of the invention is to effect the desired low temperature separation and necessary stabilization by utilizing the energy of the high pressure gas stream in carrying out the steps of the present invention.

It is also an object to effect the desired result by the use of standard, readily obtainable field units, that is, a free water separator, a low temperature treater, a simple stabilizer and an indirect heater, all arranged in accordance with the present invention to utilize the gas stream and condensate product in maintaining the various temperatures and pressures for optimum ultimate condensate recovery.

Further objects of the invention are to produce the required low temperature responsive to expansion of the gas stream to a lower pressure while allowing the hydrates to form along with the condensate, to utilize heat of the stabilized product for melting the hydrates and facilitate drawing off of the water constituent so that the water does not interfere with subsequent cooling of the condensate prior to admission into the zone of stabilization, and to cool the condensate prior to stabilization by heat exchange through refrigeration obtained directly from one of the hydrocarbon streams from the separator so as to maintain a cool zone in the top portion of the stabilizer and reduce vapor losses from the influent stream to the stabilizer.

Other objects of the invention are to utilize the cold of the separated gas for cooling the stabilized product as well as to precool the well stream, and to effect the cooling of the condensate prior to stabilization by reducing pressure of the condensate and passing the condensate at the reduced pressure in heat exchange relation with the condensate prior to pressure reduction.

In accomplishing these and other objects of the invention, we have provided an improved process which may be readily understood by reference to the accompanying drawing wherein:

Fig. 1 is a flow diagram of a form of apparatus for practicing the preferred method of the present invention.

Fig. 2 is a flow diagram of a modified form of the invention in which the warmed condensate is cooled by the cold gas which has been separated from the condensate.

Referring more in detail to the drawings:

1 designates a petroleum producing well or other source of a high pressure stream of hydrocarbon fluid. Such streams usually consist of a mixture of natural gas containing normally liquid hydrocarbons and water vapor, and free liquids including water and from which it is desired to remove the objectionable liquid such as water and to remove the desirable, normally liquid hydrocarbons in accordance with the present invention at or near the field of production. The gas may then be passed into the gathering lines of a pipe line system, or the gas may be used for repressurizing the production formation without interference by freezing and plugging of the lines by gas hydrates. The recovery of the normally liquid hydrocarbon condensates is also an important item in the economics of petroleum production in that the hydrocarbon condensates are a highly sealable product which would otherwise be lost to the producer. As above stated, recovery and stabilization of the hydrocarbon condensates in the field has not been altogether practicable because of expensive equipment and the necessity of outside materials which must be purchased and transported to the field of production.

As above stated, it is a purpose of the present invention to obtain the hydrocarbon condensates with simple equipment by utilizing the energy of the gas stream in carrying out the various changes in temperature and pressures which are required to perform the steps of the methods in accordance with the present invention.

In keeping with the present invention, the first step is to remove the objectionable liquid such as free water and to effect removal of the desirable, normally liquid hydrocarbons and water vapor responsive to cooling of the gas stream to a relatively low temperature for effecting optimum condensation of the desired hydrocarbons at substantially high pressures. Normally the high pressure gas exists at a temperature substantially higher than a minimum temperature to which it can be cooled before the solid gas hydrates are produced. At the same time, the water content of such streams can be increasingly transferred from the vapor phase to the liquid phase as the stream is cooled toward such minimum temperature. Therefore, the well stream is brought from the well 1 through a pipe line or duct 2 and initially cooled in a heat exchanger 3 preferably to a temperature just above the hydrate forming temperature of the well stream at its incoming pressure. This cooling facilitates dropping out of all free water that is possible at substantially the pressure of the well stream by the time the cooled well stream is discharged through a duct 4 into a high pressure water knock-out separator 5 wherein the free water and heavy hydrocarbon oils settle out and the free water or the free water and heavy hydrocarbon oils are removed from the remaining portions of the stream by aid of a conventional interfacial level controller 6 which actuates a valve 7 in a water draw-off duct 8.

The remaining portions of the gas stream now consist of a mixture of vapor or a mixture of vapors and hydrocarbon liquids, and these are removed through a duct 9 and discharged through an expansion valve 10 into a pipe connection 11 with a high pressure separator 12. By means of the expansion valve 10, the fluid stream is reduced to a substantially lower pressure which is maintained within the separator 12. The reduction in pressure results in reducing the temperature of the gas stream to a point where hydrocarbon components and water vapor of the initial flow stream are condensed and the water content of the condensate freezes and/or unites with portions of the gas to form the objectionable gas hydrates. These ice particles and/or gas hydrates are carried along with the gas stream into a gas separating space 13 in the upper portion of the separator 12.

The cold gas, on entering the separator 12, maintains a cold zone in the space 13 to effect optimum condensation of hydrocarbons. The condensates flow downwardly to collect in a liquid body 14 within a relatively warm zone in the lower portion 15 of the separator. The solid particles precipitate into the body of collected liquid and melt therein. The water component of the hydrate particles separates from the hydrocarbon condensates and collects in a layer 16 on the bottom of the separator. The separated water is drawn from the bottom of the separator through a duct 17 under control of an interface controller 18 that actuates a discharge valve 19 in the water draw-off duct 17.

The separated hydrocarbon condensates are removed from the separator through a discharge duct 20 having a valve 21 that is operated by a liquid level controller 22 so as to maintain a fixed level of the body of liquid in the separator. The cold separated gas is discharged from the cold zone in the top of the separator through a duct 23 under control of a pressure regulating valve 24 so as to maintain a predetermined pressure within the separator. The pressure regulating valve 24 is set so that the separated gas may be discharged at a suitable pressure for the introduction into a gas sales delivery line or so that when the gas is to be used for repressuring, the gas may be returned to the formation with preferably a single compression stage.

The liquid discharged through the duct 20 consists of a mixture of hydrocarbons, and when placed in storage at substantially atmospheric temperatures and pressures, the high vapor pressure components flash out and carry therewith the valuable low vapor pressure components. As above stated, this loss in the valuable hydrocarbons is substantially greater because the low temperature separation results in an increased amount of condensate, and a corresponding increased amount of the high vapor pressure components so that the stripping effect is likewise greater. Consequently, the increased recovery brought about by low temperature separation is disappointing since the ultimate recovery from the stock tank is not in keeping with the optimum quantity of condensate recovered in the low temperature separator.

In accordance with the present invention, the condensate discharged from the separator 12 is stabilized in a simple stabilizer 25. The stabilizer includes an elongated tower 26 having a vapor space 27 at its upper end into which the hydrocarbon liquids are flashed because of a pressure reduction effected by the valve 21, previously referred to. The pressure reduction of the hydrocarbon liquids results in cooling thereof so as to maintain a relatively low temperature within the portion 27 of the stabilizer and thereby substantially reduce the amount of low vapor pressure constituents that are discharged from the stabilizer through a duct 28 under control of a pressure reducing valve 29 that is set to maintain the desired pressure within the space 27.

In order to precool the hydrocarbon liquid, the expansion chilled liquid is preferably passed through a heat exchanger 30 that is located within the duct 20 at a point between the separator and the control valve 21 so that the cold resulting from the reduced pressure is utilized to cool the hydrocarbon liquid as it is discharged from the separator. The expansion chilled liquid passes from the space 27 downwardly through a contact section 31 of the stabilizer which may comprise a plurality of bubble trays or any suitable contact material to obtain surface necessary to accomplish the desired contact of the liquid with hot vapors moving in countercurrent flow whereby the hydrocarbon liquid is heated and has removed from it by component interchange, undesirable lower boiling fractions.

Since the hydrates and free water have been removed in the bottom of the low temperature separator, they do not interfere with the action in the stabilizer.

Located below the contact section 31 is a tray 32 having a collar 33 through which the hot vapors are passed, as later described. The collar cooperates with the wall of the stabilizer to provide a liquid collecting space 34 in which the liquid reaching the bottom of the contact section is collected and passed through an outlet duct 35 to a heating coil 36 in a salt bath indirect heater 37. The heater includes a burner 38 that is preferably supplied with fuel from the duct 28 by means of a pipe 39. The liquid, on passing through the coil 36, is heated and the hot liquid is returned through a duct 40 which connects with the stabilizer at a point below the tray 32, so that the hot vapors evolved from the hot liquid move upwardly through the collar 33 and pass in counterflow with the descending stream of liquid to provide the heated vapors previously referred to.

The heated liquid portion is now stabilized and collects in the bottom portion 41 of the stabilizer. The stabilized liquid is drawn off through a duct 42. The liquid flowing through this duct is utilized for heating the body of liquid collecting in the separator and to provide the warm zone. This is accomplished by providing a coil 43 within the body of liquid and which has inlet and outlet ducts 44 and 45 connected with the duct 42 in bypassing relation with a control valve 46 whereby only an amount of heated liquid is circulated through the heating coil to maintain the desired temperature of the condensate in the bottom of the separator.

In order to further cool the stabilized liquid, the cold gas discharged from the top of the separator is passed through a heat exchanger 47 which is also connected into the duct 42. A heat exchange is thus effected between the cold separated gas and the hot stabilized liquid so that the stabilized liquid may be cooled and carried to the stock or storage tank at or near atmospheric temperature. There is sufficient cooling effect in the cold gas after passing through the heat exchanger 47 so that the cold gas may be passed through the heat exchanger 3 and used as the cooling medium for precooling the well stream, as previously described.

As one example of operation of this form of our invention, the high pressure well stream which may be at a pressure of 3,000 p. s. i. g. is brought to the heat exchanger 3 where the temperature may be reduced to approximately 80° F. before passing the stream into the water knock-out separator 5. In the water knock-out separator 5, the water may be removed by way of the draw-off duct 7 and the gas and liquid hydrocarbons are discharged through the duct 9 to be expanded down to the lower pressure in the separator 12 which may be 900 p. s. i. g. The temperature would be reduced in the separating space 13 of the separator to approximately 8° F. This temperature is sufficient to effect condensation of the desirable hydrocarbons and to effect freezing and precipitation of water vapor as hydrates. The hydrates that are formed precipitate into the body of condensate liquid 14 maintained in the lower and warmer portion of the separator where the temperature is sufficient to melt the solid particles. The resulting water collects in the bottom of the separator for automatic draw off through the valve 19. The condensate (hydrocarbon liquid) free from the water and objectionable hydrates is passed through the heat exchanger 30 and through the pressure reducing valve 21 to effect chilling of the condensate at a pressure desirable for stabilization. In this example, condensate may be chilled to a temperature of approximately 20° F. and the pressure in space 27 in the stabilizer may be approximately 200 p. s. i. g.

The chilled hydrocarbon liquids are discharged into the space 27 of the stabilizer 25 where they flow downwardly in counterflow contact with upwardly rising hot vapors. The descending liquid hydrocarbon is progressively heated and the rising vapors are progressively cooled as a result of the counterflow contact. In this process, components of the liquid reach their boiling points and components of the vapors reach their dew points, and as a result vapor is condensed and part of the liquid is vaporized. Repeated contact results in a vapor stream which contains most of the undesirable high vapor pressure components (i. e. propane and lighter) and a liquid stream containing mostly low vapor pressure components (i. e. butane, pentane, etc.).

Liquids reaching the bottom of the contact section are collected in the liquid collecting space 34 on the tray 32 and are drawn off through the duct 35 to be heated in the salt bath indirect heater 37. The hot liquid mixture is returned through the duct 40 into the space 41 where the vapors pass upwardly through the collar 33 and contact section of the tower while the stabilized liquids collect in the bottom of the tower at a temperature, in this example, which may be approximately 300° F. The liquids are drawn off from the stabilizer through the duct 42 to the valve 46 where the flow is divided, a portion flowing through the heating coil 43 to heat the liquids collecting in the bottom of the separator and the remaining portion passing the valve for remixture with the portion that is passed through the coil 43. The partially cooled stabilized liquid is additionally cooled by heat exchange contact with the separated cold gas in the heat exchanger 47. The stabilized liquid is now cooled to substantially atmospheric temperature and may be kept in storage without any substantial loss in volume. The cooled separated gas, after passing the heat exchanger 47, is passed through the heat exchanger 3 to precool the well flow prior to admission to the knock-out separator.

The form of the invention shown in Fig. 2 is substantially the same with the exception that the cold separated gas flowing in the duct 23 is used for precooling the hydrocarbon condensates prior to reduction of pressure by the control valve 21. The cold gas from the separator is discharged through a duct 23 which conducts the flow through a heat exchanger 49 in the discharge line 48 leading from the separator to the stabilizer. In this form of the invention, the heating coil 43 may be supplied with a heating medium through other sources. The hot stabilized liquid is brought in heat exchange contact with the cold gas discharged from the heat exchanger 49. The latter heat exchange is effected by connecting the cold gas discharge of the heat exchanger 49 with the heat exchanger 47 in the duct 23.

What we claim and desire to secure by Letters Patent is:

1. The method of producing a stabilized hydrocarbon liquid product from a hydrocarbon fluid stream including, cooling said stream to effect condensation in a separating and condensing zone of the liquifiable hydrocarbon content of the fluid stream, flashing the hydrocarbon condensate into a stabilizing zone of lower pressure, heating the liquid collecting in a lower portion of the stabilizing zone, passing the vapors evolved from said heating step into counterflow with the hydrocarbon condensates in the stabilizing zone to form a stabilized liquid hydrocarbon product, removing the hot stabilized product from the zone of stabilization, removing cold separated gas from said separating and condensing zone, and both cooling said hot stabilized product and precooling the incoming feed by heat exchange with said last mentioned separated gas.

2. The method of producing a stabilized hydrocarbon liquid product from a high pressure hydrocarbon fluid stream including expanding the fluid of said stream into a lower pressured separating and condensing zone to chill the fluid and effect an optimum condensation of liquefiable hydrocarbon content of the fluid stream, flashing the hydrocarbon condensate into a stabilizing zone of lower pressure, heating the liquid collecting in a lower portion of the stabilizing zone, passing the vapors evolved from said heating step into counterflow with the hydrocarbon condensates in the stabilizing zone to form a stabilized liquid hydrocarbon product, removing the hot stabilized product from the zone of stabilization, removing cold separated gas from said separating and condensing zone, cooling the hot stabilized product by heat exchange with the cold separated gas, and passing the cold separated gas thus heat exchanged into heat exchange relation with the incoming stream to precool said stream.

3. The method of producing a stabilized hydrocarbon liquid product from a high pressure hydrocarbon fluid stream including removing free liquids from said stream, expanding the fluid of said stream into a lower pressured separating and condensing zone to chill the fluid and effect an optimum condensation of liquefiable hydrocarbon content of the fluid stream, flashing the hydrocarbon condensate into a stabilizing zone of lower pressure, heating the liquid collecting in a lower portion of the stabilizing zone, passing the vapors evolved from said heating step into counterflow with the hydrocarbon condensates in the stabilizing zone to form a stabilized liquid hydrocarbon product, removing the hot stabilized product from the zone of stabilization, removing cold separated gas from said separating and condensing zone, cooling the hot stabilized product by heat exchange with the cold separated gas, and passing the cold separated gas thus heat exchanged into heat exchange relation with the incoming stream to precool said stream.

References Cited in the file of this patent

UNITED STATES PATENTS

| | | |
|---|---|---|
| 2,073,953 | Weir et al. | Mar. 16, 1937 |
| 2,156,234 | Bays | Apr. 25, 1939 |
| 2,183,968 | McCormick et al. | Dec. 19, 1939 |
| 2,197,197 | Schuit | Apr. 16, 1940 |
| 2,214,678 | Raigorodsky | Sept. 10, 1940 |
| 2,342,165 | Plummer | Feb. 22, 1944 |
| 2,348,681 | Houghland | May 9, 1944 |
| 2,528,028 | Barry | Oct. 31, 1950 |